United States Patent [19]
Aronberg et al.

[11] Patent Number: 6,117,188
[45] Date of Patent: Sep. 12, 2000

[54] SYSTEM AND METHOD USING TOKEN PROCESSING TO CONTROL SOFTWARE DISTRIBUTION AND DESKTOP MANAGEMENT IN A COMPUTER NETWORK ENVIRONMENT

[75] Inventors: David B. Aronberg, Nyack; Dov J. Goldman, White Plains; Peter A. Spiro, Rye, all of N.Y.

[73] Assignee: Cognet Corporation, Valhalla, N.Y.

[21] Appl. No.: 09/067,655

[22] Filed: Apr. 27, 1998

[51] Int. Cl.[7] .................................................. G06F 9/445
[52] U.S. Cl. ............................................................. 717/11
[58] Field of Search .............................. 395/712; 717/11

[56] References Cited

U.S. PATENT DOCUMENTS

| | | | |
|---|---|---|---|
| 4,888,798 | 12/1989 | Earnest | 705/54 |
| 5,421,009 | 5/1995 | Platt | 709/221 |
| 5,555,416 | 9/1996 | Owens et al. | 717/11 |
| 5,666,501 | 9/1997 | Jones et al. | 345/348 |
| 5,724,345 | 3/1998 | Guarneri et al. | 370/316 |
| 5,752,041 | 5/1998 | Fosdick | 717/11 |
| 5,845,090 | 12/1998 | Collins, III et al. | 709/221 |
| 5,933,647 | 8/1999 | Aronberg et al. | 717/11 |
| 5,982,892 | 11/1999 | Hicks et al. | 705/51 |
| 6,009,525 | 12/1999 | Horstmann | 713/200 |

OTHER PUBLICATIONS

Heilbronner, S.; "Managing PC Networks". IEEE/IEE Electronic Library[online], IEEE Communications Magazine, vol. 35, Iss. 10, pp. 112–117, Oct. 1997.

Gumbold, M.; "Software Distribution by Reliable Multicast". IEEE/IEE Electronic Library[online], Proceedings on the 21st IEEE Conference on Local Computer Networks, pp. 222–231, Oct. 1996.

Parsons et al.; "Intellegent agents in an enterprise management architecture". IEEE/IEE Electronic Library[online]. 1997 Intl. Conference on Intelligent Processing Systems (ICIPS '97), Oct. 1997.

Start et al.; "The distribution management of service software". Science Server[online]. Computer Standards and Interfaces, vol. 17, Issue 3, pp. 291–301, Jun. 1995.

Rozenblit, M.; "Secure Software Distribution". IEEE/IEE Electronic Library[online]. 1994 IEEE Network Operations and Management Symposium. Symposium Record, vol. 2, pp. 486–496, Feb. 1994.

Perin, C.; "Configuration and software distribution in maintenance environments on heterogenous platforms". IEEE/IEE Electronic Library[online]. Conference on Software Maintenance. Proceedings, pp. 269–274, Oct. 1991.

White et al.; "ABYSS: an architecture for software protection". IEEE/IEE Electronic Library[online]. IEEE Transactions on Software Engineering, vol. 16, Issue 6, pp. 619–629, Jun. 1990.

*Primary Examiner*—Tariq R. Hafiz
*Assistant Examiner*—Kelvin E. Booker
*Attorney, Agent, or Firm*—Arthur L. Plevy; Buchanan Ingersoll PC

[57] ABSTRACT

A system for controlling the distribution of software in a customized configuration to a plurality of computers in a network environment, comprising console means for creating distribution control information which is both associated with the software and related to said customized configuration, server means responsive to the console means for storing the software and the distribution control information; agent means resident on each computer for downloading the software in accordance with the distribution control information and a token authorization signal from a token server means, and token server means for controlling the number of users simultaneously distributing the software, the token server means responsive to a token request signal from the agent means to provide a token authorization signal to the agent means authorizing the agent means to download the software onto the corresponding computer.

20 Claims, 5 Drawing Sheets

SYSTEM AND METHOD USING TOKEN PROCESSING TO CONTROL SOFTWARE DISTRIBUTION AND DESKTOP MANAGEMENT IN A COMPUTER NETWORK ENVIRONMENT

CROSS-REFERENCE TO RELATED APPLICATIONS

The present application is related to copending commonly assigned Patent application, Ser. No. 08/792,938, filed on Jan. 24, 1997, by Aronberg, et al., entitled "SYSTEM AND METHOD FOR SOFTWARE DISTRIBUTION AND DESKTOP MANAGEMENT IN A COMPUTER NETWORK ENVIRONMENT", incorporated herein by reference.

FIELD OF THE INVENTION

The present invention is related to computer network systems and more particularly to a system for distributing software and managing desktops on computers on the network by limiting the number of simultaneous distributions using token server processing.

BACKGROUND OF THE INVENTION

A complete software distribution and desktop management system for computer networks requires features such as automatic profiling of applications, control and management of the distribution of software, mass customization of computers on the network, and total support for a Windows 95 or NT based operating system. Present software distribution and desktop management systems such as Microsoft Systems Management Server (SMS), Seagate's Wininstall, Symantec Norton Network Administrator Suite (NAS), McAfee Associates Saber LAN Workstation, Tangram AM/PM, and Novell Netware Navigator, only provide some of these features and only to a certain extent. Moreover, while automated software distribution is highly desirable, a significant problem exists when multiple workstations attempt to perform simultaneous downloads. Workstations attempting to simultaneously distribute software in a networked LAN or WAN environment may experience significant degradation in system performance because of resource contention. Such degradation may be manifest in system timeouts, data transfer errors, excessive wait times, or database lockouts, to name a few. When large networks of 255 or more workstations are involved, such problems arising from simultaneous software distribution attempts are particularly significant, and may result in intolerable network delays or outright failures in distributing the software to the intended platforms.

Prior attempts to limit the number of simultaneous software distributions have focused primarily on manual efforts by an administrator who sequentially distributes software to each intended platform (i.e. workstation) by manually performing the distribution at a particular location and then proceeding to the next target platform, or by setting a plurality of time intervals or windows, (i.e. one window per target platform), during which the distribution may occur at each location. Both processes, however, are slow and inefficient, requiring an administrator to spend extraordinary time either performing the distributions or determining the relevant distribution windows and hopefully estimating the appropriate number of users that may distribute during a given time interval without causing a resource conflict. However, if such conflicts occur, such as simultaneous attempts to access the data base, causing system lockouts or transfer errors, no clean method of scaling back the number of users requesting access is currently available.

Consequently, a need exists for efficiently controlling the maximum number of workstation agents which may perform distributions simultaneously. A need also exists to provide a method in which the number of users can be scaled back (or enhanced) based on existing network resources and current or prospective network activity.

The present invention provides a system and method for controlling and/or limiting the number of simultaneous software distributions so that there is no significant degradation in system performance (i.e. timeouts, transfer errors, excessive wait time, etc.) during platform distribution. The present invention provides a token server for issuing tokens to each requesting agent on a workstation downloading applications in order to control the number of simultaneous distributions. The present invention also provides a main console screen which allows an administrator to specify a number of configurable parameters, including the number of tokens available, representing the maximum number of simultaneous jobs.

The present invention provides a graphical interface for viewing and modifying changes to the registry giving the administrator complete control over the registry, including the ability to update and modify parameter values.

Accordingly, it is an object of the present invention to provide a complete software distribution and desktop management system for a computer network environment. It is a further object of the present invention to provide a software distribution and desktop management system with full integration into a graphical user interface based operating system. Still a further object of the present invention is to provide a mechanism to control the maximum number of agents that may perform the software distributions simultaneously.

SUMMARY OF THE INVENTION

The present invention is a system for controlling the number of simultaneous distributions of software in a customized configuration to computers in a network environment. The system includes a console means for creating distribution control information which is both associated with the software and related to the customized configuration. A server means responsive to the console means stores the software and the distribution control information. Linked to the server means is an agent means residing on each computer for downloading the software from the server means, in accordance with the distribution control information and a token authorization signal from a token server means. The server means includes a token server means for controlling the number of users simultaneously distributing the software, the token server means responsive to a token request signal from the agent means to provide a token authorization signal to the agent means authorizing the agent means to download the software onto the corresponding computer. The agent means resides on each computer which downloads the software. Preferably, the console means, agent means and server means are each a computer with a Windows 95 or NT based operating system.

BRIEF DESCRIPTION OF THE DRAWINGS

The invention will be better understood with reference to the following illustrative and non-limiting drawings, wherein like features are like numbered throughout the drawings, in which.

DETAILED DESCRIPTION OF THE INVENTION

Although the present invention can be used in many different computer network environments where a complete software distribution and management solution is useful, the present invention as described herein is especially suited for use in a graphical user interface based operating system. Accordingly, the present invention will be described in conjunction with a Windows 95 or NT operating system based computer network environment.

A complete software distribution and desktop management system for computer networks requires features such as automatic profiling of applications, effortless distribution of software, mass customization of computers on the network, and total support for the operating system such as Windows 95 and Windows NT. Many networked systems, particularly large networks of 255 or more workstations also require features for controlling and/or limiting the number of simultaneous software distributions so that there is no significant degradation in system performance (i.e. timeouts, transfer errors, excessive wait time, etc.) during platform distribution.

Figure 1:
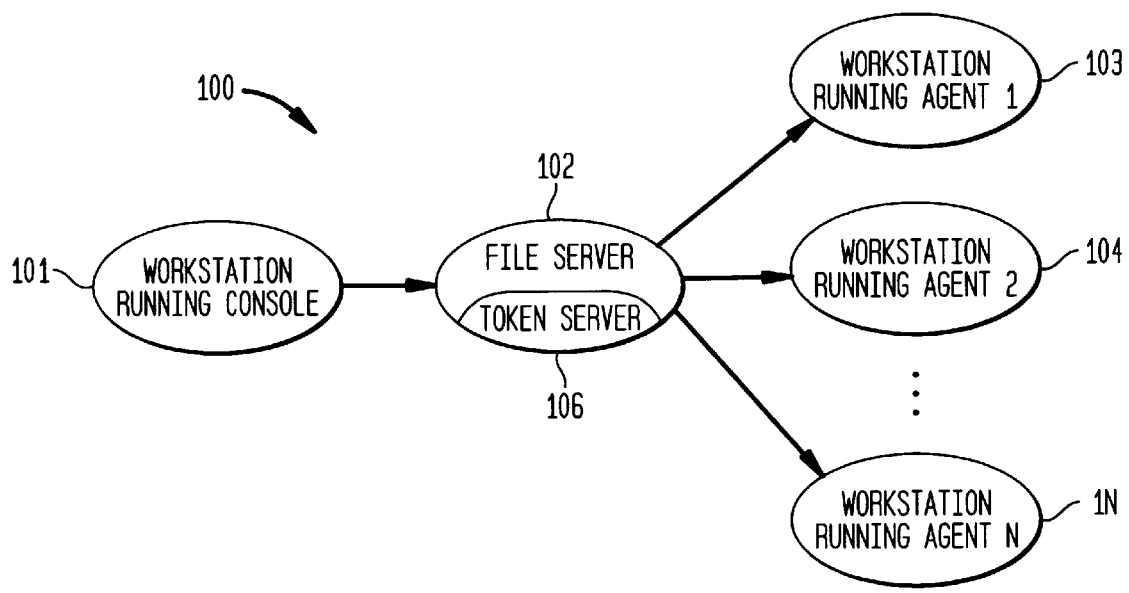
FIG. 1 is a system overview schematic of the present invention.

Referring now to FIG. 1 there is shown a system overview schematic 100 of a typical network arrangement in accordance with the present invention. Software distribution and desktop management is performed from the workstation running the console 101 component of the present invention which includes an administrator. The workstation running the console 101 is linked to the file server 102 which in turn is linked to workstations 103, 104, . . . , 1N (referred to as N) running the agent components of the present invention. It is noted that in the present invention the profiling occurs on the console 101, the profile is stored on the file server 102, and the profile is distributed to the agents N. The profile is a set of instructions to the N computers on how to install any application. As one can ascertain, few resource problems arise when the number of workstations receiving software distributions is small, since the number of database connections and socket connections is sufficient to support the various platform distributions. However, when large numbers of workstations (i.e. agents) simultaneously attempt to download applications, network performance may be adversely affected by contention among users requesting data base access as well as errors in data transmission resulting from increased network activity. In the preferred embodiment of the present invention, the file server 102 contains a token server feature 106 which communicates with each workstation's agent in a client server relationship at the network protocol level to control and limit the number of agents which simultaneously attempt to download applications to their respective target workstations (i.e. platforms). Any protocol supporting the Windows 95 or Windows NT environment is sufficient to support the token server communication. Network control is accomplished by requiring each agent to request and obtain a token from the token server before performing the software distribution at that platform. While FIG. 1 shows the token server 106 resident on file server 102, the token server may reside on any Windows 95 or Windows NT workstation in the network, including the console, or on any other networked server having sufficient memory to support installation and execution.

Figure 2:
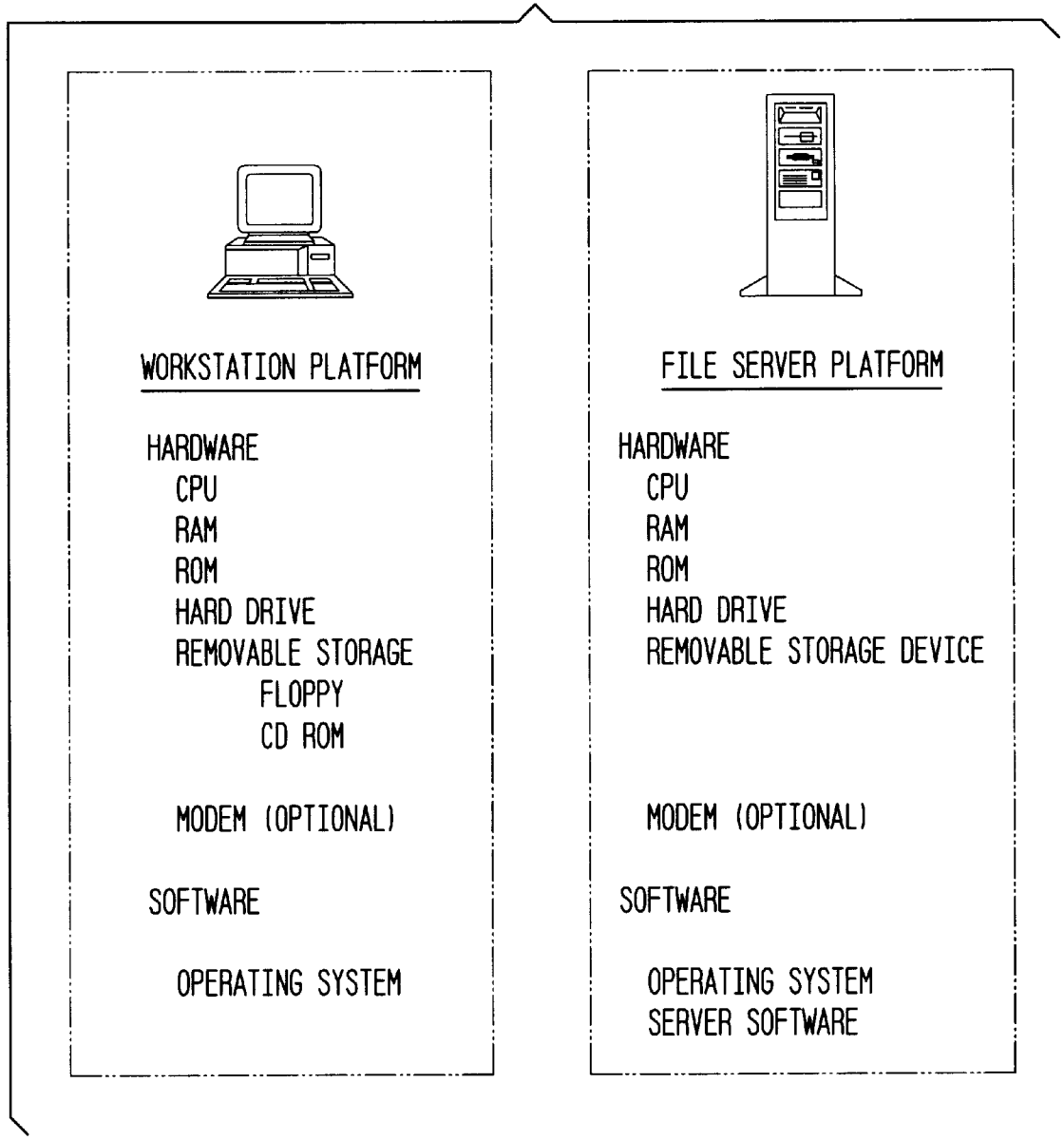
FIG. 2 is a schematic of the hardware and software platforms for the present invention.

Referring now to FIG. 2, there is shown a display of typical hardware elements for a workstation and a file server, and respective software elements which configure the hardware elements for operation in accordance with the present invention. A typical workstation platform running the console, token server, or agent, includes hardware such as a central processing unit (CPU), e.g. a Pentium microprocessor, RAM, ROM, hard drive storage, modem, and optional removable storage devices such as a floppy drive or a CD ROM drive. The workstation hardware is configured by software including an operating system, e.g., Windows 95 or NT, networking software, and either the console or agent software components. The functionality of the console, token server and agent software is defined in more detail by the remaining figures and the discussion thereto. A typical server platform includes hardware such as a CPU, e.g., Pentium microprocessor, RAM, ROM, hard drive, modem, and optional removable storage devices, e.g., floppy or CD ROM drive and database. The server hardware is configured by software including an operating system, e.g., Windows 95 or NT, networking software, and database software.

The software distribution process is controlled by the administrator which profiles an application. The profile is stored in a database on the file server 102. The administrator schedules a distribution of the application, i.e., profile, using the scheduler, and specifies which agent based workstations 103, 104, . . . 1N should receive the application using a condition builder. Such profilers, schedulers and condition builders are shown and described in Patent application, Ser. No. 08/792,938, filed on Jan. 24, 1997, by Aronberg, et al., entitled "SYSTEM AND METHOD FOR SOFTWARE DISTRIBUTION AND DESKTOP MANAGEMENT IN A COMPUTER NETWORK ENVIRONMENT". The administrator also selects whether the token server feature should be activated to control the number of agents which can simultaneously distribute software to their respective platforms.

Figure 3:
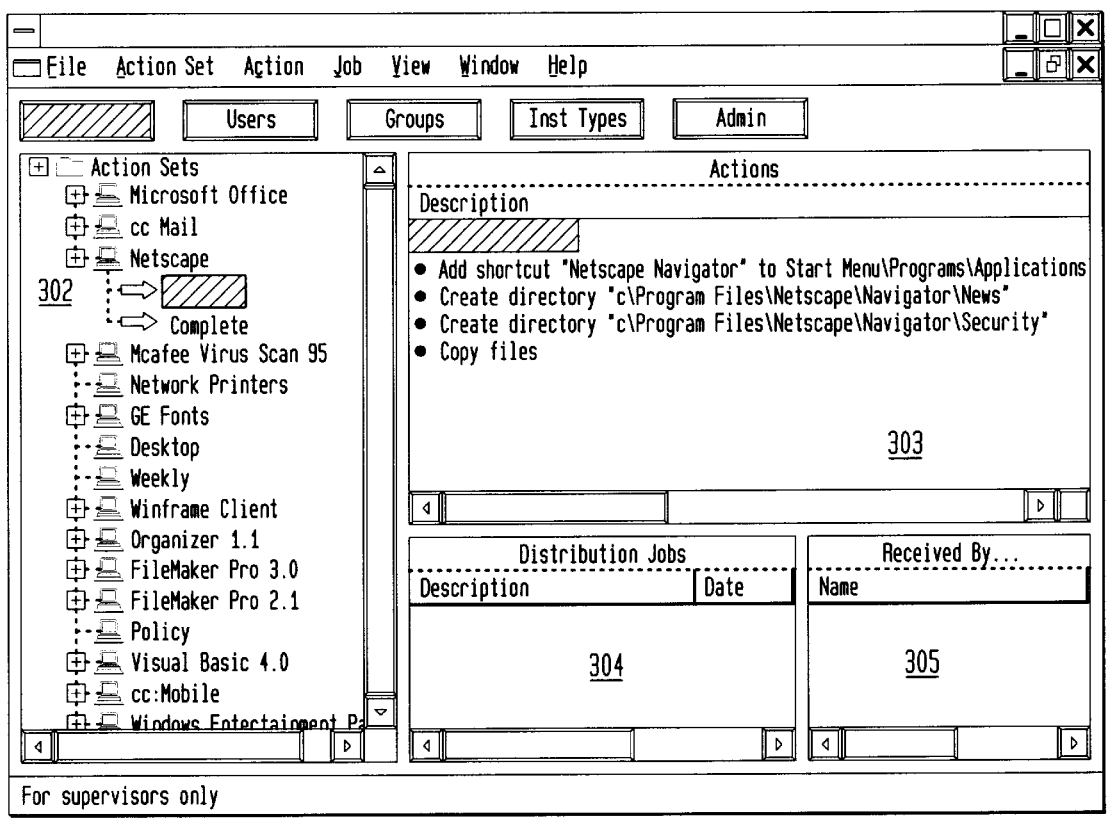
FIG. 3 shows a main window through which the present invention is controlled from the workstation running the console.

Referring to FIG. 3 there is shown a main window 301 through which the present inventive token server feature is controlled from the workstation running the console. Various actions sets 302 are selected by clicking on a particular application and choosing an install type. Particular actions available to the user are described in a boxed area 303. The distribution of the jobs and the agents to receive the jobs are noted in boxed areas 304 and 305, respectively.

Figure 4:
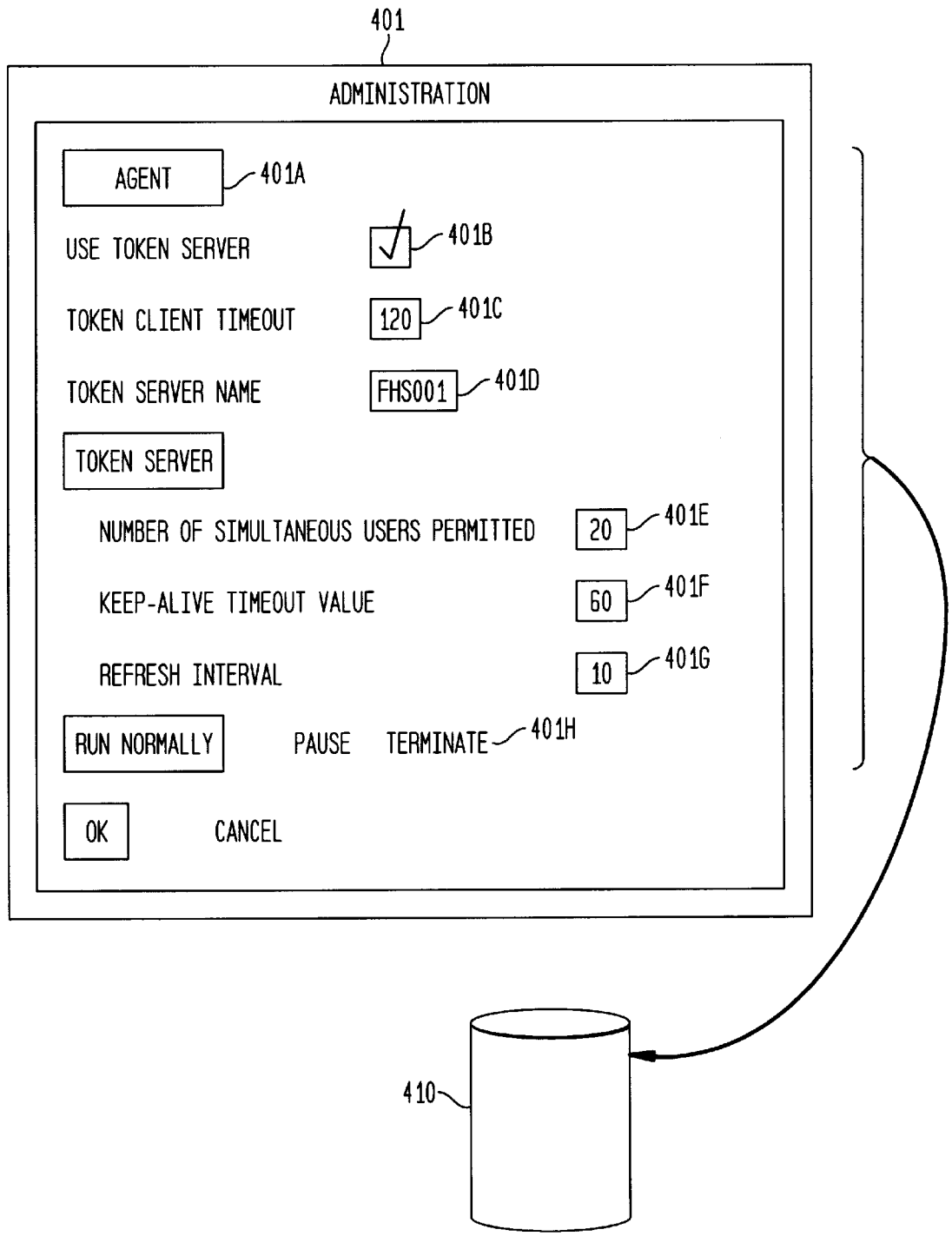
FIG. 4 shows a dialog box, accessed from the window in FIG. 3, from which administrative token server actions by the user are selected.

Referring to FIG. 4, there is shown a dialog box 401, accessed from the main window of FIG. 3, from which the administrator may select and control the number of concurrent software distributions in order to minimize resource contentions. Referring to FIG. 4, the agent tab 401A is selected and the Use Token Server box 401 B is checked to indicate use of the token server feature. Note that if the token server feature is not selected, then agents will not request and await the issuance of a token before performing software distributions but rather immediately proceed to download the requisite software upon checking and determining that outstanding jobs exist at their respective platform.

Referring again to FIG. 4 the amount of time that an agent will wait for a token after requesting one (in seconds) is entered in the Token Client Timeout field 401C. The networking name of the computer executing the token server feature is entered in the Token Server Name field 401D to identify the computer name to all of the networked workstations. Field 401E allows the administrator to enter the maximum number of simultaneous users permitted to download applications across the network. This value is represents the maximum number of available tokens (MNAT). Alternatively, this number is also the number of users which may simultaneously access the system data base for downloading applications. Field 401F allows the administrator to control the amount of time (seconds) an agent has to perform a distribution and release its token. If the agent does not release its token within the user-specified time interval, the token server assumes that the agent has crashed and automatically releases the agent's token. A refresh interval field 401G allows the administrator to specify (seconds) how often the token server view on the console may be refreshed, provided it is open, while module 701H allows the administrator to select the mode in which the agent will execute. If a mode other than Run Normal mode is selected (i.e. Pause mode or Terminate Mode), the agent will either pause or terminate when it next requests a token from the token server. Upon processing and exiting the dialog box 401, the data base 410 is updated with the user-entered information. Note that a userdefined polling interval (not shown) downloaded with the control information permits each agent to know when to check for existing distribution jobs.

Figure 5:
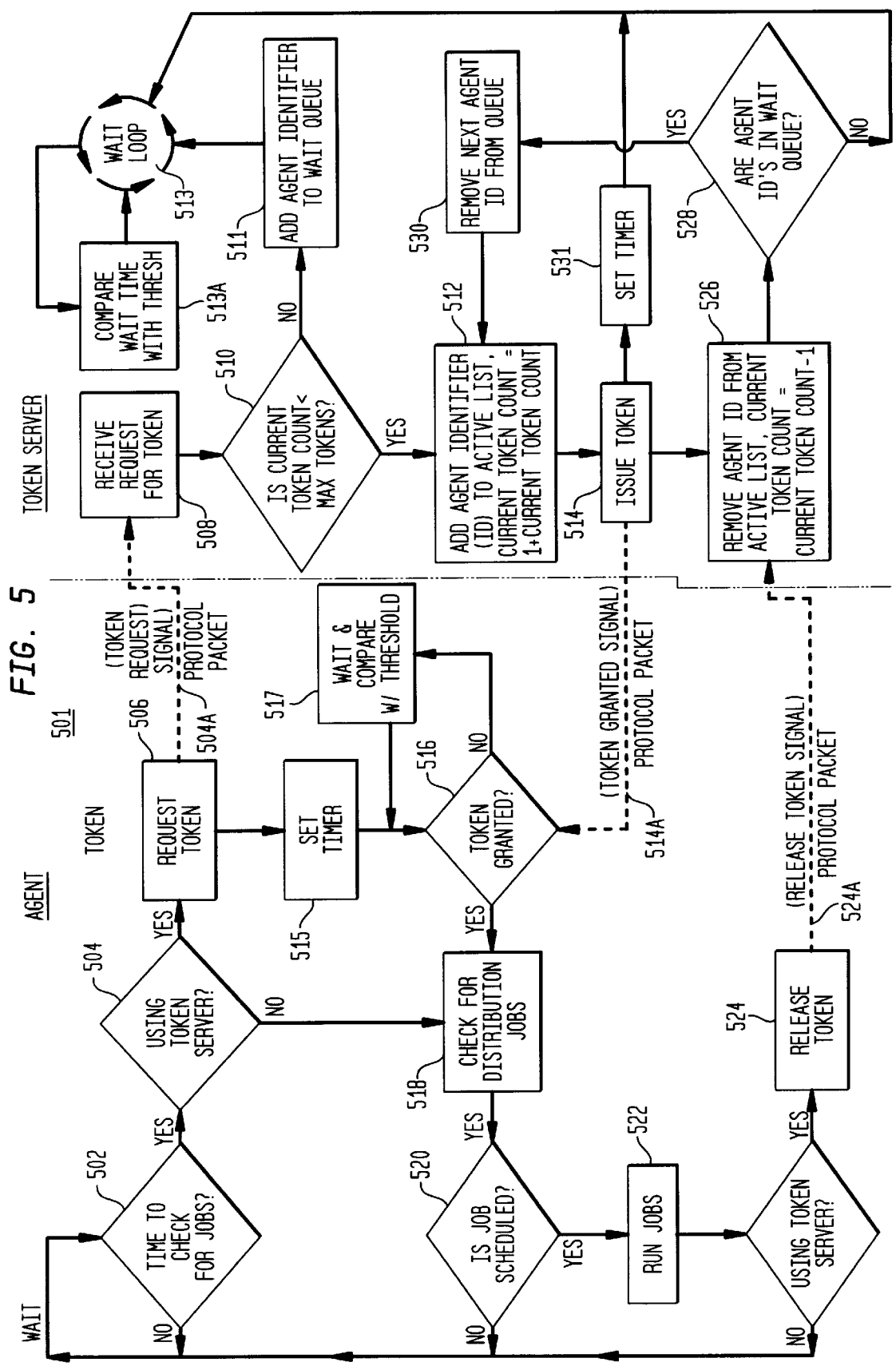
FIG. 5 shows a schematic of the token server control process of the present invention.

Referring now to FIG. 5, there is shown a schematic 501 of the process for controlling the number of simultaneous software distributions illustrating the operation of the token server feature in combination with an agent resident on a target workstation for downloading the applications. First, an agent at each workstation periodically compares its internal timer with the user-defined polling time interval stored in the data base to determine whether the agent should check for distribution jobs outstanding at its workstation. Upon determining that a check for distribution jobs is required (module 502), the agent then determines whether the token server feature has been activated (module 504). If the network is using the token server feature, then a request token protocol packet is generated (506) and sent over the network to the token server who receives the request (508) via standard network communication protocol. The request token signal 506A includes the requesting platform and agent identifier (ID) to allow proper tracking. The token server, upon receiving the signal (module 508), obtains and compares the current token count with the user-defined (see FIG. 4, module 401E) maximum number of tokens (i.e. simultaneous users) as shown in module 510. The current token count corresponds to the number of active users in the system having tokens who are either downloading or polling the database. If the current token count is not less than the user-defined maximum number of available tokens, then the identification (ID) associated with the requesting agent is placed in a wait list of queued agents awaiting an available token (module 511) and the token server enters a wait state 513 until it receives another protocol message from an agent requesting another token or a release token signal 524A indicating that a token is now available. If, however, the token count is less than the maximum, then the requesting agent ID is added to a list of active agents and the current token count is incremented by one (module 512). The token server then issues a token (module 514) by sending a token granted signal 514A protocol message to the requesting agent, which has been in a wait state 517 since sending the request token message. The requesting agent remains in Wait State 517 until either a token granted message 514A is received from the token server (module 516) or the wait time exceeds the user-defined token client timeout (see module 701C) that the agent will wait for a token after requesting one. The elapsed wait time is determined after the agent requests a token and initializes a timer (module 515) to track the elapsed time. If the wait time is exceeded, processing returns to initial state 502. If the issue token message is received by the agent, the agent initiates a check for distribution jobs (module 518). If no jobs are scheduled, the agent returns to module 502. If a job is scheduled (module 520), then the scheduled jobs are run (module 522) and the software is distributed at that workstation. Upon completion of all scheduled jobs, the token is released (module 524) and a release token signal 524A protocol message indicating token release is sent to the token server module 526 which, responsive to the received message, removes the agent ID from the active list and decrements the current token count by one (module 526). The token server then determines if there agent IDs remain in the wait queue (module 528). If none exist, then the token server again enters wait state 513. If, however, the queue is not empty (i.e. waiting agents), then the next agent ID on the FIFO wait queue list is removed (module 530) and placed on the active list, the current token count is incremented, and an issue token protocol message is delivered to the corresponding agent residing on the target platform. Note that, in module 513, the token server also tracks the time the Agent has to perform a distribution and release its token. In module 51 3A, the token sever periodically compares the elapsed wait time of each agent who has been graned a token with the user-specified timeout interval (see FIG. 4 module 401F). The elapsed wait time is determined after the token server grants the token and initializes a timer (module 531) to track the elapsed wait time. If the wait time is exceeded, the token server assumes an error condition has occurred and releases the agent's corresponding token automatically. If the distribution is not appropriate for a particular agent, then that agent goes back to sleep, i.e., does not perform a distribution.

In the preferred embodiment, the present invention for controlling the maximum number of simultaneous users is used in conjunction with the scheduling, condition-expression building, profiling and monitoring associated with the overall software distribution and installation process. Further, in the preferred embodiment, the token server feature executes continuously on the file server (or other designated networked machine). In this manner, the token server may be viewed from the workstation running the console to determine status, including user IDs and user names of the active and queued agents.

The token server feature may be administratively activated or deactivated at any time and with any number of users (i.e. agents). Preferably, the token server feature is activated not later than when twenty agents are resident in the network. In this manner, an administrator is provided with a flexible, efficient, automated means for controlling network activity and fine tuning the network to adequately handle the present workload requirements consistent with available network resources. Moreover, the token server parameters illustrated in FIG. 4 may be modified at the console workstation by editing the user-entered field values to fine tune network performance. For example, if an administrator desires to increase the number of available tokens to permit more users to simultaneously access the database and download applications, then a higher value would be entered in field 401E (see FIG. 4) and the dialog box processed. The database 410 on server 102 would then be updated to contain the user-updated value. Similarly, if a shorter agent wait time is desired, the system token client timeout filed 401C would be reduced and the corresponding entry in database 410 would be updated. Thus, the next time an agent requests a token and proceeds into wait state 516 (see FIG. 5), the agent would compare its clock time with the new database timeout value to determine if a timeout condition has occurred.

It should be understood that a person skilled in the art may make many variations and modifications to these embodiments utilizing functionally equivalent elements to those described herein. For example, the file server is discussed above as a distinct computer device in the network environment, however, the file server can readily reside in a secondary hard drive storage device with its own operating system on the console workstation. Any and all such variations or modifications as well as others which may become apparent to those skilled in the art, are intended to be included within the scope of the invention as defined by the appended claims.

What is claimed is:

1. A method for controlling the number of simultaneous distributions of software to a plurality of computers in a network environment having a console means for creating distribution control information which is both associated with said software and related to a customized configuration, server means responsive to said console means for storing said software and said distribution control information, and agent means for downloading said software in accordance with said distribution control information, said method comprising the steps of:

receiving a token request from said agent means;

determining whether an existing token is available for use by said agent means; and providing an available token for use to said agent means to enable said agent means to distribute said software.

2. The method according to claim 1, wherein the step of determining whether an existing token is available includes the steps of:

comparing the current token count with a user-defined maximum token count; adding an identifier corresponding to said requesting agent means to a list and incrementing the current token count when the current token count is less than the user-defined maximum token count;

adding said identifier corresponding to said requesting agent means to a wait queue when the current token count is not less than the user-defined maximum token count.

3. The method according to claim 1, further including the step of removing said identifier from said list and decrementing said current token count when said distribution timeout has occurred.

4. The method according to claim 3, further including the step of removing said identifier from said list and decrementing said current token count when a release token signal is received from said corresponding agent means.

5. The method according to claim 4, further including the steps of:

responsive to said release token signal, determining if the wait queue is empty, removing the next identifier in the wait queue and placing said identifier in the active list, incrementing the current token count and issuing said available token to said agent means corresponding to said next identifier.

6. A system for controlling the distribution of software in a customized configuration to a plurality of computers in a network environment, comprising:

console means for creating distribution control information which is both associated with said software and related to said customized configuration, server means responsive to said console means for storing said software and said distribution control information, said server means including token server means;

agent means corresponding to each said computer for downloading said software in accordance with said distribution control information and a token authorization signal from said token server means, each said agent means residing on said corresponding computer; and said token server means responsive to said control information for controlling the number of users simultaneously distributing said software, said token server means responsive to a token request signal from said agent means to provide a token authorization signal to said agent means authorizing said agent means to download said software onto said corresponding computer.

7. The system according to claim 6, wherein said distribution control information created by said console means includes token server profile parameters utilized by said token server means in determining the issuance of said token authorization signal to said requesting agent means.

8. The system according to claim 7, wherein said token server profile parameters include:

maximum number of available tokens (MNAT), agent token wait time, and maximum agent distribution time.

9. The system according to claim 8, said token server means including: comparison means for comparing the current token count with the maximum number of available tokens to determine if a token is available;

first means responsive to said comparison means for storing an identifier (ID) corresponding to said requesting agent in a list and incrementing the current token count when said current token count is less than said MNAT.

10. The system according to claim 9, wherein said token server provides said token authorization signal to said requesting agent means when said current token count is less than said MNAT.

11. The system according to claim 10, wherein said token server means further includes remove means responsive to a release token signal from said agent means for removing the ID of the corresponding agent from said first means and decrementing the current token count.

12. The system according to claim 10, wherein said token server means further includes means responsive to said remove means for determining if an agent ID is in said wait queue and sending a signal to said first means in response thereto.

13. The system according to claim 10, wherein said token server means further includes timer means for comparing the elapsed time said token authorization signal was sent with said maximum agent distribution time and removing said agent ID from said list and decrementing said current token count when said maximum agent distribution time is exceeded.

14. The system according to claim 9, wherein said agent means includes means for determining if said token server means is active; and means for determining pending distribution jobs.

15. The system according to claim 11, wherein agent means further includes agent timer means for comparing the elapsed time said token request signal was sent with said token timeout time and terminating when said token timeout time is exceeded.

16. The system according to claim 6, wherein said plurality of computers is at least 255, and wherein said computers have an operating system selected from the list consisting of a Windows 95, Windows NT based operating systems.

17. In a system for a customized distribution of a software in a computer network environment comprising: a console based workstation which administers said customized distribution of said software throughout said computer network environment, a file server which receives said software and information related to a configuration of said software for said customized distribution, and an agent based workstation which retrieves from said file server said software in accordance with said configuration of said software as determined by said console based workstation, the improvement therewith comprising:

a token server means resident on said file server for controlling the number of simultaneous users distributing said software, said token server means responsive to said agent means and said control information to provide a signal enabling said agent means to retrieve said software from said file server for distribution.

18. The system according to claim 17, wherein said token server includes means for responsive to a release token signal from said agent means when said distribution is completed for removing an identifier contained in a list corresponding to said agent means and decrementing a database value which corresponds to the number of tokens currently in use by said system.

19. The system according to claim 1, wherein said number of tokens currently in use corresponds to the number of active users.

20. A method for controlling a number of simultaneous distributions of software to a plurality of computers in a network environment having a console means for creating distribution control information which is both associated with said software and related to a customized configuration, server means responsive to said console means for storing said software and said distribution control information, and agent means for downloading said software in accordance with said distribution control information, said method comprising the steps of:

receiving a token request from said agent means;

comparing the current token count with a user-defined maximum token count;

adding an identifier corresponding to said requesting agent means to a list and incrementing the current token count when the current token count is less than the user-defined maximum token count;

adding said identifier corresponding to said requesting agent means to a wait queue when the current token count is not less than the user-defined maximum token count;

setting a timer after said available token is provided to said agent means and comparing the elapsed time with a user-defined threshold timeout value to determine if a distribution timeout has occurred; and, providing an available token for use to said agent means to enable said agent means to download said software.

* * * * *